Aug. 30, 1966   J. J. KRIZ   3,269,783
OVERHEAD CLEARANCE DETECTOR FOR VEHICLES
Filed July 13, 1965   2 Sheets-Sheet 1
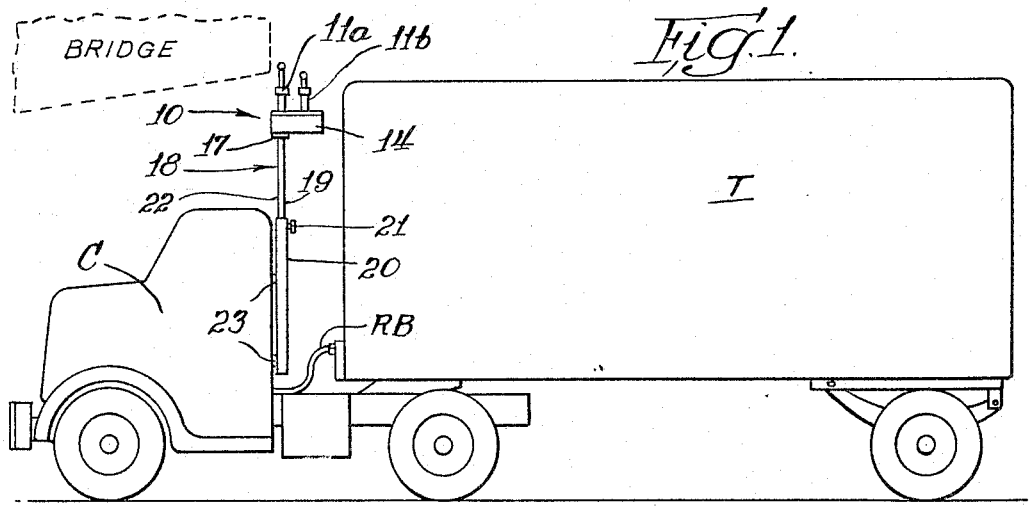
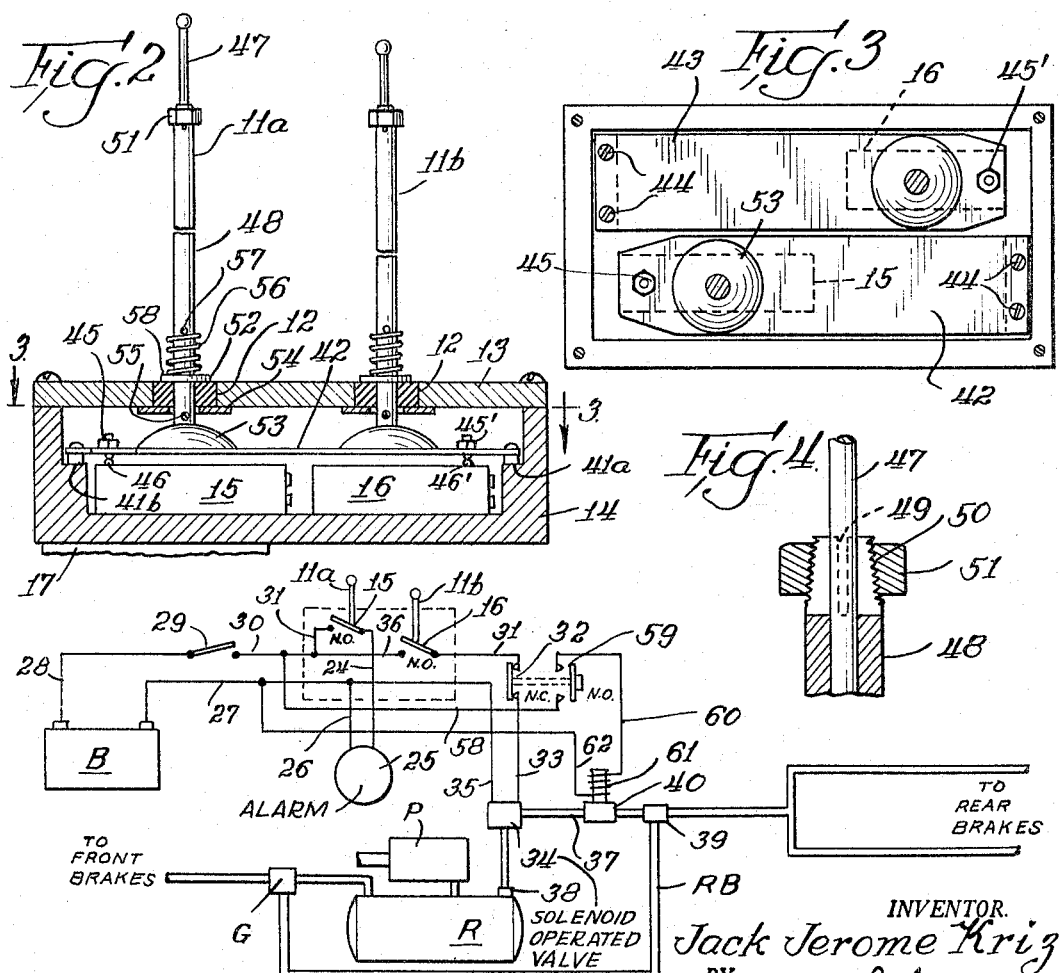
INVENTOR.
Jack Jerome Kriz
BY Brown, Jackson,
Boettcher & Dienner
Att'ys.

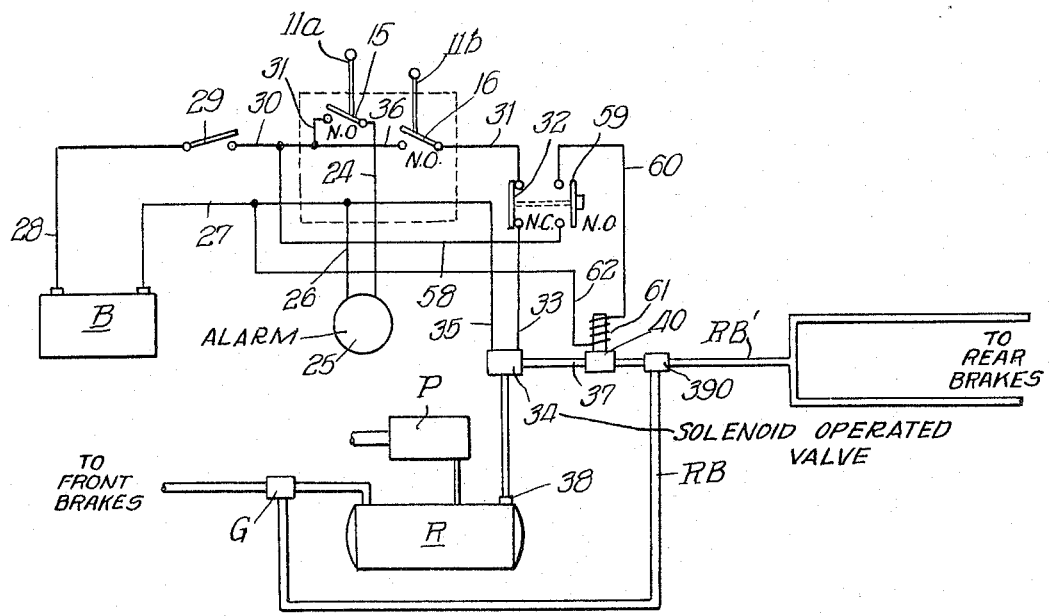
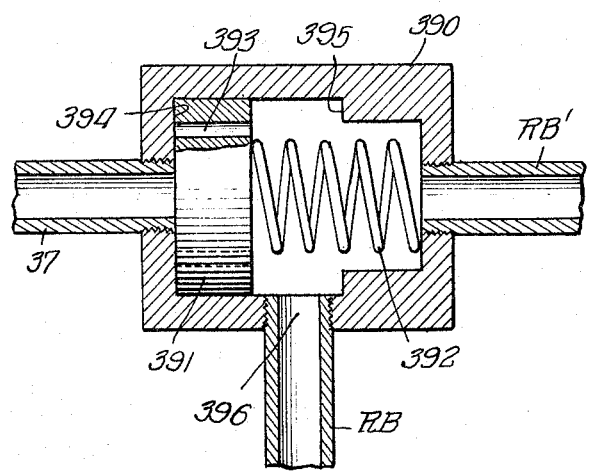

3,269,783
OVERHEAD CLEARANCE DETECTOR
FOR VEHICLES
Jack Jerome Kriz, 9351 Tripp Ave., Skokie, Ill.
Filed July 13, 1965, Ser. No. 480,221
9 Claims. (Cl. 303—18)

This application is a continuation-in-part of my co-pending application, Serial No. 131,239, filed August 14, 1961, now abandonded, and relates to an overhead clearance sensory device comprising novel means which may be mounted on a truck or other vehicle and used to first warn and, if unheeded, to automatically stop further progress of the vehicle beneath a bridge or other overhead structure where the clearance beneath the structure approaches and/or is less than that which is required for safe progress of the vehicle.

The numerous low height bridges which cross our highways have long been a source of annoyance and actually represent a potential danger to the trucking industry. Many thousands of dollars have been suffered both to the truck and to its load as a result of miscalculations in relating the height of trucks and the clearance space beneath an overhead bridge. In many counties and states this has led to laws requiring that the clearance of overhead bridges be plainly marked and appropriate by-passes indicated. Such markings are, of course, useful but they also pre-suppose and require a degree of alertness on the part of the truck driver that he both see the notice and also that he be guided thereby. The usefulness of such markings is also obviously dependent on the driver's knowledge of the height of the load and/or vehicle which he is driving. For example, the height of the trailer or cargo body from the roadbed can vary several inches dependent on the weight of the load, thus a heavy load rides lower on the springs of the vehicle than does a lighter load or an empty cargo body. Furthermore, the clearance beneath an overpass or bridge is itself subject to change. For example, in the wintertime, a fresh snowfall, an accumulation of ice or simply a resurfacing of the highway decreases the clerance beneath a bridge by several inches and so lull a driver of a vehicle into a false sense of security and with disastrous consequences.

In those instanaces where the bridge is unmarked or the driver has any reason for suspecting that the height of his vehicle exceeds the clearance safety factor, about all that a driver can do is rely on eye judgment of a helper, if he has one, or his own judgment if he has no helper. Such judgments must often be taken at such angles and under circumstances as to be almost worthless and the operator must simply elect either to take a chance with no assurance of whether or not there is a safety factor or to back up his truck and try to find a route around the bridge.

It is therefore a principal object of the present invention to provide means which will eliminate the factor of "chance" by not only warning the driver when he is approaching the limit of his safe clearance as he drives the vehicle beneath the bridge, but will automatically take over control of the vehicle and stop its further progress when a preset minimum safe clearance factor is exceeded (negatively) and/or ignored by the driver.

To this end, my invention comprises an attachment device which may be suitably mounted on the cab, tractor or trailer of a truck or other vehicle so as to be supported at a desired height about the top level of the vehicle and/or load. The attachment comprises means in the form of two adjacently spaced antennae of unequal height each adapted to operate a switch in one of two electrical circuits appropriately connected into the electrical system of the vehicle. One of these circuits will include an alarm which may comprise a buzzer, bell, flashing light or other signal so as to be energized on closing of the switch. This circuit I arranged to be under the control of the taller one of the two antennae such that when the taller antenna contacts the overhead structure, the alarm is energized to signal to the driver that his vehicle is outside a present minimum safety factor and further forward progress of the vehicle should be attempted only while observing extreme caution and at a low rate of speed. The other circuit I arrange so that its switch is closed by the shorter antenna. In this second circuit I provide means associated with the brake system of the vehicle so that if the shorter antenna comes into contact with the overhead structure, the effect will be to set the brakes of the vehicle and halt its further progress. I also include means operable from within the cab which the driver may actuate to permit release of the brakes in order that the driver may back the vehicle out from beneath the overhead structure. I furthermore contemplate not only that the support for the attachment device will be adjustable so as to permit setting its height in accordance with the load or height of the vehicle to allow a minimum clearance safety factor, but I also contemplate that the height of the antenna also will be adjustable to permit the operator or owner of the truck to determine the variance in clearance between the warning height and that beoynd which the vehicle cannot encroach.

A further feature of my invention is that I contemplate that the antenna will be so constructed that they will bend before breaking. I also contemplate that the attachment devices may be provided with a cut-out switch for deenergizing one or both circuits as when the truck is being driven beneath branches of trees or the like which are sufficiently yielding as not to impede the progress of the vehicle or to give the driver concern.

Many other features as well as advantages of the invention will be apparent or will become so from the detailed description of a preferred embodiment of the invention which now will be described.

Referring first to the drawings:

FIGURE 1 illustrates a truck having an embodiment of the invention mounted thereon;

FIGURE 2 is a side elevational view of the antennae supporting structure shown partly in section to illustrate one manner of mouting the antennae and relating them to the operating switches;

FIGURE 3 is a sectional view taken along lines 3—3 of FIGURE 2 looking in the direction indicated by the arrows;

FIGURE 4 is a fragmented partially sectioned view taken longitudinally through one of the antennae to show how the two parts thereof are adjustably secured together, it being understood that both antennae are similarly constructed;

FIGURE 5 is a schematic plan view of the described embodiment of the invention and illustrates the electrical circuitry by which the components of the embodiment are operatively connected and associated with each other.

FIGURE 6 is a schematic plan view generally similar to FIGURE 5 and showing a modification thereof; and FIGURE 7 illustrates an air piloted pressure valve employed in said modification.

Referring more specifically to the several views and first to FIGURES 1 and 2, the invention is there illustrated as a sensing mechanism indicated generally at 10 and which comprises a pair of adjacently spaced upright feelers or antennae 11a and 11b having their lower ends protruding through provided openings 12 in the cover 13 of a water tight, weatherproof box or enclosure 14 in which are mounted a pair of switches 15 and 16 respectively actuated by the deflection of feelers 11a and 11b as will be hereinafter more completely describd. Box 14 is fixedly mounted as by screws or other appropriate means to the flared end 17 of a support 18 which may be a telescoping member comprising a graduated rod 19 and a receiving tube 20 having locking means such as a pin or set screw 21. Rod 19 may be provided with appropriately spaced indents or openings into which the end of locking screw 21 extends so as to prevent accidental slipping of rod 19 into the tube except on withdrawal of lock screw 21. Rod 19 is also provided with graduations 22 which serve to indicate the height at which member 18 is set. The telescoping support may comprise an attachment mounted by appropriate means such as brackets 23 to the rear or side cab C of the truck as shown in FIGURE 1 or it may be constructed as a permanent part of the cab. It may also be mounted to the forward end of the cargo body or trailer of semi, full or tandem trailer type vehicles. The important point is that the antennae be supported forwardly of and above the highest portion of the vehicle including its load. Furthermore, instead of the illustrated telescoping support 18, any other appropriate means might be utilized for supporting box 14. Also the sensing device can comprise an attachment as illustrated or it may be built into the cab or trailer or cargo body as a permanent part. Deflection of antenna 11a serves to actuate a suitable warning device and deflection of antenna 11b to set the brakes of the vehicle. For this purpose a pair of electrical circuits are provided which are under the operation of the respective antennae and which circuits may be connected to the truck ignition or starting battery or to a specially provided battery.

Referring therefore to FIGURE 5, one such circuit may be seen to comprise a normally open switch 15, line 24, warning device 25, lines 26 and 27, connecting to one side of a battery B, the circuit being completed by line 28 connected to the other side of the battery master switch 29, lines 30 and 31 back to switch 15. Assuming master switch 29 to be closed, closing of switch 15 therefore functions to energize warning device 25 which may be a horn, bell, buzzer, flashing light or any other appropriate electrically energizable signaling means, the same being located in the cab of the truck or tractor or at any other convenient location.

Similarly 16 also represents a normally open switch which when closed completes a circuit represented by line 31, normally closed switch 32, line 33, solenoid-operated valve 34, line 35, line 27, battery B, line 28, master switch 29, line 30 and line 36. As illustrated in FIGURE 5, solenoid-operated valve 34 is located in a by-pass conduit 37 which I connect at 38 to a tank R containing compressed air or other fluid. Its other end I connect by means of a T connection 39 into conduit RB of the brake system leading from the foot brake operated valve G to the brakes of the rear wheels. 40 represents a one way check valve in conduit 37 between valve 34 and the T-connection 39 which opens to allow pressurized fluid to proceed therethrough from the tank R but not in reverse. Therefore, closing of switch 16 causes valve 34 to open allowing air or other fluid to be pumped by means of compressor P from tank R through conduit 37 past the check valve 40 into conduit RB to set the brakes on the rear wheels of the vehicle.

Although any suitable means may be provided for placing switches 15 and 16 under the control of antennae 11a and 11b, respectively, a preferred construction will now be described. As illustrated in FIGURE 3 switches 15 and 16 are arranged within the interior of the box 14 at diagonally opposite corners and the two sidewalls of the box having ledges 41a and 41b on which one end of each of a pair of blade springs 42 and 43 is mounted as by screws or other appropriate fastening means 44. Blade spring 42 is fastened at one end to ledge 41a, and its free end is provided with an adjustable contact 45 for engaging depressible pin 46 of switch 15. Similarly blade spring 43 is fastened at one end to the opposite ledge 41b and its free end is provided with an adjustable contact 45' for engaging depressible pin 46' of switch 16.

Each of the two antennae 11a and 11b being of similar construction and similarly mounted in cover 13, it will suffice to describe one and its manner of operation. Therefore, referring again to FIGURE 2, the two antennae are seen to comprise telescoping member 47 and 48, 47 by representing a rod 47 received within the hollow core of a tube 48. The upper end of tube 48 is slotted at 49 and has externally tapered threaded portion 50 about which a collet 51 is threadedly connected. The length of the two antennae may be therefore conveniently adjusted by simply loosening collet 51 on its threaded connection. This releases the grip of the slotted end of the tube 48 on rod 47 so that the rod may be raised or lowered to a desired height. Retightening of the collet on the tapered threaded portion 50 then serves to confine rod 47 in an adjusted telescoped relation with tube 48.

The lower end of each antenna extends through a resilient grommet 52 which may be of rubber or the like. If desired, the sidewalls of opening 12 may be slightly concaved and preferably the grommet is cemented to the sidewalls of said opening 12. In any event, grommet 52 is purposely sized so as to tightly fit within opening 12 and also against tube 48 to assure an essentially water tight seal. The grommets being of resilient material nevertheless permit the respective antennae to pivot on their seat therein in response to deflction of the antenna from any direction. An actuating head 53 is rigidly secured, as by welding to the lower end of tube 48. Preferably head 53 is cup shaped and has a diameter equal to several times that of the antenna. In the upright normal position of the antenna, its actuating head 53 rests flat on blade spring 42 between its fastened end at 41a and its contact 45 and without exerting pressure thereon. However, when the antenna is deflected as when coming into contact with an overhead structure, its actuating head 53 serves to transmit and, simultaneously, to magnify the pivoting action of the antenna on its seat within grommet 52 so that blade 42 is depressed and its contact 45 caused to engage contact 46 of micro switch 15, closing the circuit which energizes warning device 25. Similarly, a deflection of the shorter antenna 11a serves to depress blade 43 and thereby to close switch 16 to energize valve 34 and set the brakes of the vehicle.

Beneath grommet 52 is a retaining washer 54 held in place by a retaining pin 55 passed through tube 48, the diameter of washer 54 being greater than the diameter of grommet 52 to prevent accidental withdrawal of either the grommet or the antenna with which it is assembled. The inner diameter of washer 54 is also larger than the diameter of the antenna so as not to interfere with the pivotal action of the antenna in the grommet. To retain the weight of the antenna off the blade spring in the normal upright position of the antenna, a compression spring 56 is provided about tube 48 and confined between the upper or outer surface of the grommet and a retaining pin 57 passed through tube 48. Instead of spring 56 directly engaging grommet 52, an intervening washer 58 may be interposed.

As previously described, actuation of switch 16 in response to a deflection of antenna 11a serves to open valve 34 and thereby permits delivery of pressurized air through bypass line 37 into conduit RB leading to the rear brakes of the vehicle. To release the brakes, check valve 40 is provided with a normally closed vent. This vent is solenoid operated so that it may be operated by closing normally open switch 59 in an electrical circuit which comprises, starting at one side of battery B, line 28, master switch 29, lines 30, 58, switch 59, line 60, solenoid 61 of the vent in valve 40, line 62, and line 27 back to the battery B. Closing of switch 59 serves to open said vent in valve 40 to permit air to bleed from the brakes while opening of switch 32 serves to close valve 34 wherefore further pressure on the brakes is relieved as well as vented. Therefore, for convenience switches 59 and 52 will be operated together as by a single push button located on the dashboard or other suitable location in the vehicle cab.

In the form of the invention thus far described, it is assumed that the braking structure of the vehicle on which the invention is employed is of the type where conduit RB is not open to the atmosphere through valve G when the foot brake pedal is in its released position. If the braking system of the vehicle is such that on release of the foot brake pedal air from the rear breaks does vent to atmosphere through valve G, then T 39 will be replaced by an air piloted pressure valve such as is illustrated at 390 in FIGURES 6 and 7. In this modification of the invention valve 390 (FIGURE 7) includes a plunger or reciprocable member 391 which operates against spring 392. In the normal position of the plunger 391 shown in FIGURE 7, conduit RB connects via the interior of member 390 to its RB′ leading to the rear brakes. In this position of the plunger the valve G may be operated in conventional manner as by depressing the foot pedal to set the front and rear brakes. However, when antenna 11G is deflected to close normally open switch 16 and energize solenoid-operated valve 34, the air which is thereby caused to enter conduit 37 under pressure from reservoir R first acts on plunger 391 overcoming the resistance of spring 392 and moving the plunger from seat 394 to seat 395. In this new position of plunger 391, port 396 to conduit RB is closed and pressurized air from line 37 passes through port 393 in plunger 391 for delivery only to portion RB′ of the rear brake conduit and so operates the rear brakes to stop further movement of the vehicle. When thereafter the vent in valve 40 is opened as by closing switch 59 as previously described, air pressure on plunger 391 is relieved, allowing spring 392 to return the plunger to its normal position to rest against seat 394 whereupon the air pressure on the rear brakes is relieved via RB′ port 396 into conduit RB and vented to atmosphere through valve G.

From the above description, it will be apparent that the invention is readily adaptable to all types of motor vehicles and with modifications can be adapted to any of the existing braking systems, hydraulic, mechanical, vacuum or electrical as well as pneumatic. Furthermore, installation of the device does not involve any major alterations in the braking system. For example, in an installation as described, about the only modification required of the existing pneumatic pressure system of the vehicle is to tap the air supply tank R to permit mounting a first fitting at 38 and to break conduit RB to permit adding a T-connection 39 (FIG. 5) or air piloted pressure valve 390 (FIGURE 6). A previously described by-pass line 37 is connected at one end to fitting 38 and at its other end to the fitting comprising T 39 or valve 390. In the ordinary tractor and trailer, conduit RB is conveniently accessible at the rear of the tractor so that this unit can also be mounted on the tractor. As thus installed, the automatic control overrides but does not interfere with normal operation of the braking system.

As previously noted, the antennae and switch box together comprise a unit which may be mounted at an appropriate location on the vehicle, by adjusting their support 18 to position the antenna at a height forwardly and above the highest point of the vehicle and/or its load. The two antennae are themselves also adjustable to suit particular requirements although I have found it most satisfactory if the taller feeler which controls sounding of the alarm 25, is set to allow 1½ inches of clearance and the shorter antenna which actuates the brakes is set to allow ½ inch clearance. The two valves 34 and 40 and by-pass line 37 preferably comprise a second unit which is assembled with the pneumatic brake system of a vehicle as first described. The installation of the invention is then completed by mounting the master switch 29, combination push button switches 32–59 and the warning device 25 at convenient locations within the cab and connecting leads 27 and 28 to the battery of the vehicle.

Although the master switch 29 could conceivably be omitted as not required in the operation of the attachment, its presence does provide means under the control of the truck operator by which the sensory device may be deactivated as, for example, in an off-the-road operation where overhanging branches or other light and readily movable, non-dangerous obstacles may be encountered and no precautions to avoid them need be taken. Also, when the vehicle is being driven on the open highway, it may be desirable to deactivate the sensory device so as to prevent accidental setting of the brakes which might occur should a bird, high flying debris or the like strike the controlling antennae.

However, when approaching an overhead obstruction that appears in the driver's judgment to provide insufficient clearance, he would be expected to slacken his speed, make certain the master switch was closed, i.e., in "on" position and proceed with caution. Should the clearance be so slight that the taller feeler 11a touches the obstruction, the resultant deflection of feeler 11a would close switch 15, energizing the warning device 25, and so alert the driver to the fact that his clearance is approaching the danger point. If he decides to go ahead, he may. However, if the second feeler or antenna 11b also comes into contact with the obstruction, its resultant deflection will close switch 16 to open valve 34 allowing pressurized air to be applied through lines 37 and RB to the rear brakes, thus automatically stopping progress of the vehicle. The driver then has two alternatives—either hold down switches 32–59, by which means the brakes are released, and back up to safety or after pressing down on switches 32, 59 to release the brakes, turn the master switch 29 to its "off" position and proceed forward, risking damage.

From the aforesaid description, it will be apparent that all of the objects of the invention can be conveniently obtained in a highly practical manner. Furthermore, it will be understood that the aforesaid description is not to be taken in a limiting sense, but merely as illustrative of the invention, and that many modifications, alternations and/or changes in the parts and relations thereto will suggest themselves, and are to be understood as embraced within the scope of the invention as defined by the appeneded claims which are to be interpreted as broadly as is not inconsistent with the prior art.

Having described my invention, I claim:

1. An overhead clearance sensing device for trucks and other vehicles comprising, in combination a pair of antennae of unequal height adapted for mounting on the truck or vehicle so as to protrude above the high point thereof, a warning device operably connected to the taller antenna so as to be actuated when said taller antenna is contacted by an overhead structure beneath which the truck or other vehicle on which the device is mounted is attempted to be driven, brake setting means connectable to the brake operating mechanism of said truck or other vehicle, said means being operably connected to the shorter antenna so as to be energized whereby the brakes will be actuated when the shorter antenna is contacted by the overhead structure and means for deenergizing the brake setting means to release the brakes.

2. An overhead sensing device for trucks and other vehicles comprising, in combination, upright antenna means, an adjustable support for locating the antenna means at a height above the top level of the vehicle, a warning device, a brake setting device connectable to the brake operating mechanism of the vehicle, and a pair of electrical circuits connectable to the electrical system of the vehicle, one including said warning device and a first switch, the other including the brake setting device and a second switch, said switches being operably connected to said antenna means so as to be closed by deflection of the antenna means when brought into contact with an overhead structure beneath which the truck or other vehicle on which the device is mounted is attempted to be driven.

3. An overhead clearance sensing device for trucks and other vehicles comprising a pair of adjacently spaced vertical antennae of uneven height, a pair of circuits connectable to the electrical power source of the vehicle, one circuit including an alarm device and a normally open switch means operably connected to the taller of the two feelers so as to be closed by deflection of said taller feeler when it is contacted by an overhead structure beneath which a vehicle provided with the device is driven the closing of said first switch energizing the alarm device, and the other circuit including means connectable to the brake actuating mechanism of the vehicle, a normally open switch, the normally open switch being operably connected to the shorter of the two antennae so as to energize said means connectable to the brake actuating mechanism of the vehicle to stop further forward progress of the vehicle when the said shorter antenna is contacted by the overhead structure, and operable means for opening said normally closed switch to deenergize said means connectable to the brake-actuating mechanism to allow movement of the vehicle.

4. An overhead clearance sensing device for trucks and other vehicles comprising a pair of adjacently spaced vertical antennae of uneven height, a pair of circuits connectable to the electrical power source of the vehicle, one circuit including an alarm device and a switch operably connected to the taller of the two antennae, so as to cause energizing of the alarm device when said taller feeler is contacted by an overhead structure beneath which a vehicle provided with the device is driven, the other circuit including solenoid-operating means connectable to the brake actuating mechanism of the vehicle for actuating the same when electrically energizing said other circuit further including a switch operably connected to the shorter antenna so as to energize the solenoid-operated means to actuate said mechanism when the said shorter antenna is contacted by the overhead structure, and means within the cab of the vehicle for deenergizing the solenoid-operated means to permit release of the brakes and allow movement of the vehicle.

5. An overhead clearance sensing device for trucks and other vehicles having fluid pressure actuated brakes comprising a pair of adjacently spaced vertical antenna of uneven height, a pair of electrical circuits connectable to the electrical power source of the vehicle, one circuit including an alarm device and a normally open first switch operably connected to the taller antenna so as to close the circuit to cause energizing of the alarm device when said taller feeler is contacted by an overhead structure beneath which a vehicle provided with the device is driven, the other circuit including a solenoid-operated normally closed by-pass valve connectable in the brake fluid actuating system of the vehicle adapted when opened to actuate the brakes, said other circuit further including a normally open second switch operably connected to the shorter antenna so as to be closed when the said shorter antenna is contacted by the overhead structure, said solenoid-operated valve being opened on closing of said second switch to stop movement of the truck, and means within the cab of the vehicle for closing said by-pass to permit release of the brakes and allow movement of the vehicle.

6. An overhead clearance sensing device for trucks and other vehicles having fluid pressure actuated brakes comprising a pair of adjacently spaced vertical antennae of uneven height, a pair of electrical circuits connectable to the electrical power source of the vehicle, one circuit including an alarm device and a normally open first switch operably connected to the taller antenna so as to be closed by contact of said taller antenna with an overhead structure beneath which a vehicle provided with the device is driven, the alarm device being energized by closing the switch, a by-pass connectable between the brake fluid supply of the vehicle and its rear brake actuating mechanism, a normally closed shut-off valve and normally closed venting valve in said by-pass, and said other electrical circuit including a normally open second switch, and means energizable by closing of said second switch to open said shut-off valve, said second switch being operably connected to the shorter antenna so as to close when the shorter antenna is contacted by the overhead structure so that the rear brakes of the vehicle will be actuated to stop movement of the vehicle, a normally closed third switch series-connected with said second switch in said other circuit, and means operable within the cab of the vehicle for opening said third switch, said means being arranged to simultaneously open the venting valve to permit release of the brakes and allow movement of the vehicle.

7. An overhead clearance sensing device as claimed in claim 6 further including a safety switch for deactuating the two electrical circuits.

8. An overhead clearance sensing device for trucks and other vehicles having fluid pressure actuated brakes, comprising a normally open switch, a box enclosing said switch and an adjustable support for mounting the box at a height near the top of the vehicle, an electrical circuit connectable to the electrical power source of the vehicle and including said normally open switch within said box, an upright antenna universally mounted on said box and associated with said switch to close the same when its upper end is deflected in any direction from its normally upright position, said antenna being adjustable in height so as to be located for engagement with an overhead structure beneath which a vehicle provided with the device is driven, a by-pass connectable between the fluid pressure supply of the vehicle and the rear brake-actuating mechanism thereof, said by-pass including a normally closed shut-off valve and a normally closed venting valve between the rear brake actuating mechanism and the shut-off valve, means in said electrical circuit for opening said shut-off valve in response to closing of said switch by deflection of the antenna so as to actuate the rear brakes of the vehicle to stop movement of the vehicle, a normally closed second switch, in said electrical circuit, and further means operable from within the cab of the vehicle for opening said second switch to close the shut-off valve, and said further means being arranged to simultaneously open the venting valve to permit release of the brakes and allow movement of the vehicle.

9. An overhead clearance sensing device for trucks and other vehicles having fluid pressure actuated brakes, comprising a box, normally open first and second switches mounted within said box, a pair of upright antennae universally mounted on the top of the box, one of said antennae extending higher than the other, the higher antenna having its inner end associated with said first switch to close the same when its upper end is deflected from its normally upright position and the other antenna having its inner end associated with the second switch to close it when its upper end is deflected from its normally upright position, and a support for mounting the box on the vehicle so that the antennae will be located for engagement with an overhead structure beneath which the vehicle is driven, a first electrical circuit including said normally open first switch and an alarm device series-connected therewith so as to be energized on closing of said switch to indicate that the higher antenna has engaged the overhead structure, a by-pass conduit connectable between the fluid pressure supply of the vehicle and the brake-actuating mechanism thereof, said by-pass conduit including a normally closed shut-off valve and a normally closed venting valve, a second electrical circuit including said second normally open switch, a normally closed third switch, and means series-connected with said second and third switches for opening said shut-off valve in the by-pass conduit on closing of the second switch whereby the brakes of the vehicle will be actuated to stop movement of the vehicle when the lower antenna is deflected by an overhead structure, a third electrical circuit including a normally open fourth switch and means for opening the venting valve when said fourth switch is closed, and means operable from within the cab of the vehicle for simultaneously opening said third switch and closing the fourth switch whereby to close the shut-off valve and opening the venting valve when it is desired to release the brakes and move the stopped vehicle from beneath the overhead structure.

References Cited by the Examiner
UNITED STATES PATENTS

| | | | |
|---|---|---|---|
| 1,925,763 | 9/1933 | Kirechen | 180—83 |
| 2,720,275 | 10/1955 | Thayer | 180—83 |
| 2,834,002 | 5/1958 | Nordsiek | 340—61 |

EUGENE G. BOTZ, *Primary Examiner.*